Figure 1:
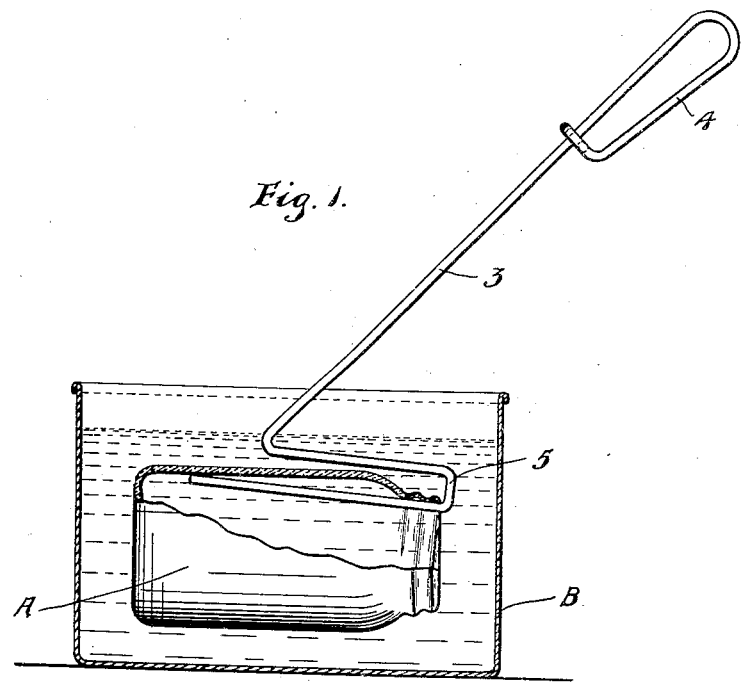

A. C. BURLINGAME.
FRUIT JAR AND BOTTLE LIFTER.
APPLICATION FILED JULY 21, 1919.

1,337,540.

Patented Apr. 20, 1920.

INVENTOR.
ALBERT C. BURLINGAME.
BY HIS ATTORNEYS.

UNITED STATES PATENT OFFICE.

ALBERT C. BURLINGAME, OF MINNEAPOLIS, MINNESOTA.

FRUIT JAR AND BOTTLE LIFTER.

1,337,540.   Specification of Letters Patent.   Patented Apr. 20, 1920.

Application filed July 21, 1919. Serial No. 312,168.

*To all whom it may concern:*

Be it known that I, ALBERT C. BURLINGAME, a citizen of the United States, residing at Minneapolis, in the county of Hennepin and State of Minnesota, have invented certain new and useful Improvements in Fruit Jar and Bottle Lifters; and I do hereby declare the following to be a full, clear, and exact description of the invention, such as will enable others skilled in the art to which it appertains to make and use the same.

My invention has for its object to provide an extremely simple and very low cost fruit jar and bottle lifter, and to such ends generally stated, the invention consists of the novel construction and arrangement of parts hereinafter described and defined in the claim.

This device is made from a single piece of stiff wire, preferably spring steel wire, bent to form a handle at one end and at the other end, an oblique U-shaped portion, one prong of which U-shaped portion is adapted to be inserted into a bottle to hold the same at will, either in a horizontal, or in an inverted position.

The special purpose of this device is to handle fruit jars or bottles in scalding same, preparatory to loading the same with fruit, vegetables, or other goods that are to be stored for the winter.

The invention is illustrated in the accompanying drawings, wherein like characters indicate like parts throughout the several views.

Figure 2:
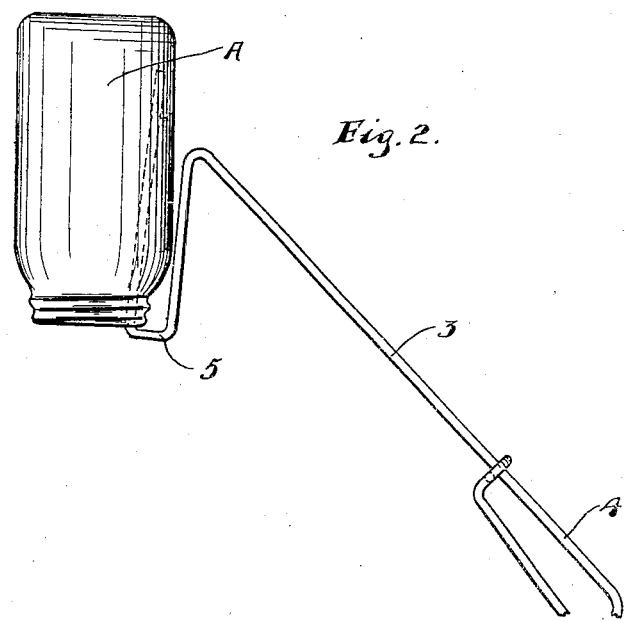

Referring to the drawings:

Figure 1 is a view chiefly in vertical section, but with some parts in full, and some parts broken away, showing the device used to hold a fruit jar in a receptacle of boiling water; and Fig. 2 is a perspective view showing the manner in which the device is used to hold a jar inverted to drain the same after it has been sterilized.

The fruit jar is indicated by A and the receptacle for containing water indicated by B. The lifter, or lifting tool is made from a single piece of spring steel wire or the like, indicated as an entirety by the numeral 3. This wire or like rod at one end is bent to form a suitable handle 4 and at its other end is bent to form an appositively U-shaped elongated loop 5, both prongs of which are oblique to the body portion 3. The outer prong of the U portion 5 is longer than the other portion, and projects a considerable distance into the jar.

When the jar is applied as shown in Fig. 2, it is held so that it may rotate and may be inverted, but will not lose its position on the lifter. The inverted edge of the jar will rest on the bow of the U portion 5, as shown in Fig. 2. In this position, the jar may be carried about on the lifter and may be properly drained. When the jar is inserted into the water of the receptacle B, as shown in Fig. 1, it may be rolled about until it is thoroughly sterilized and then picked up and drained as already indicated. The utility of this device will be obvious to anyone who has put up fruit or vegetables in jars or bottles. The cost thereof, is extremely small. It is highly important that both prongs of the U portion 5 should be at an oblique angle to the body or stem of the lifter. This allows the jar or bottle to be in a vertical inverted position when the handle is in an oblique position, and gives the operator much better control and better means to handle the jar or bottle than any other arrangement with which I am familiar.

What I claim is:

A fruit jar or bottle lifter made from a single piece of wire, bent at one end to form a handle and at its other end to form an oblique U-shaped portion, the outer prong of which is adapted to enter the jar or bottle, the outer prong of said U-shaped portion being longer than the inner or the attached prong thereof, and said handle portion being at an acute angle to the prongs of said U-shaped portion.

In testimony whereof I affix my signature in presence of two witnesses.

ALBERT C. BURLINGAME.

Witnesses:
CLARA DEMAREST,
BERNICE G. BAUMANN.